United States Patent
Higginbotham

[15] 3,649,044
[45] Mar. 14, 1972

[54] VEHICLE LEVELING SYSTEM
[72] Inventor: William W. Higginbotham, Monroe, Mich.
[73] Assignee: Monroe Auto Equipment Co., Monroe, Mich.
[22] Filed: Mar. 23, 1970
[21] Appl. No.: 21,894

[52] U.S. Cl. ..........................................280/124 F, 267/65 D
[51] Int. Cl. ..........................................................B60g 17/00
[58] Field of Search ..........................280/124 F; 267/15, 65

[56] References Cited

UNITED STATES PATENTS 3,071,394   1/1963   Miller..................................280/124 F
2,837,167   6/1958   Loofbourrow........................180/79.2

*Primary Examiner*—Philip Goodman
*Attorney*—Harness, Dickey & Pierce

[57] ABSTRACT

A vehicle leveling system comprising a pair of fluid actuatable leveling devices for controlling the relative attitude between sprung and unsprung portions of a vehicle; a fluid reservoir for supplying actuating fluid to the leveling devices and fluid passage defining means for transmitting the fluid between the source thereof and the devices; pumping means including a hydraulic pump operable in response to energization of the means on the associated vehicle for producing electrical energy, such as the generator, alternator or the like; fluid accumulator means for receiving fluid from the source thereof and transmitting the same to the leveling devices, and valve means actuatable in response to predetermined relative movement between the sprung and unsprung portions of the vehicle for controlling the flow of actuating fluid through the fluid passage means extending between the fluid source and the leveling devices.

35 Claims, 5 Drawing Figures

Patented March 14, 1972
3,649,044
2 Sheets-Sheet 1
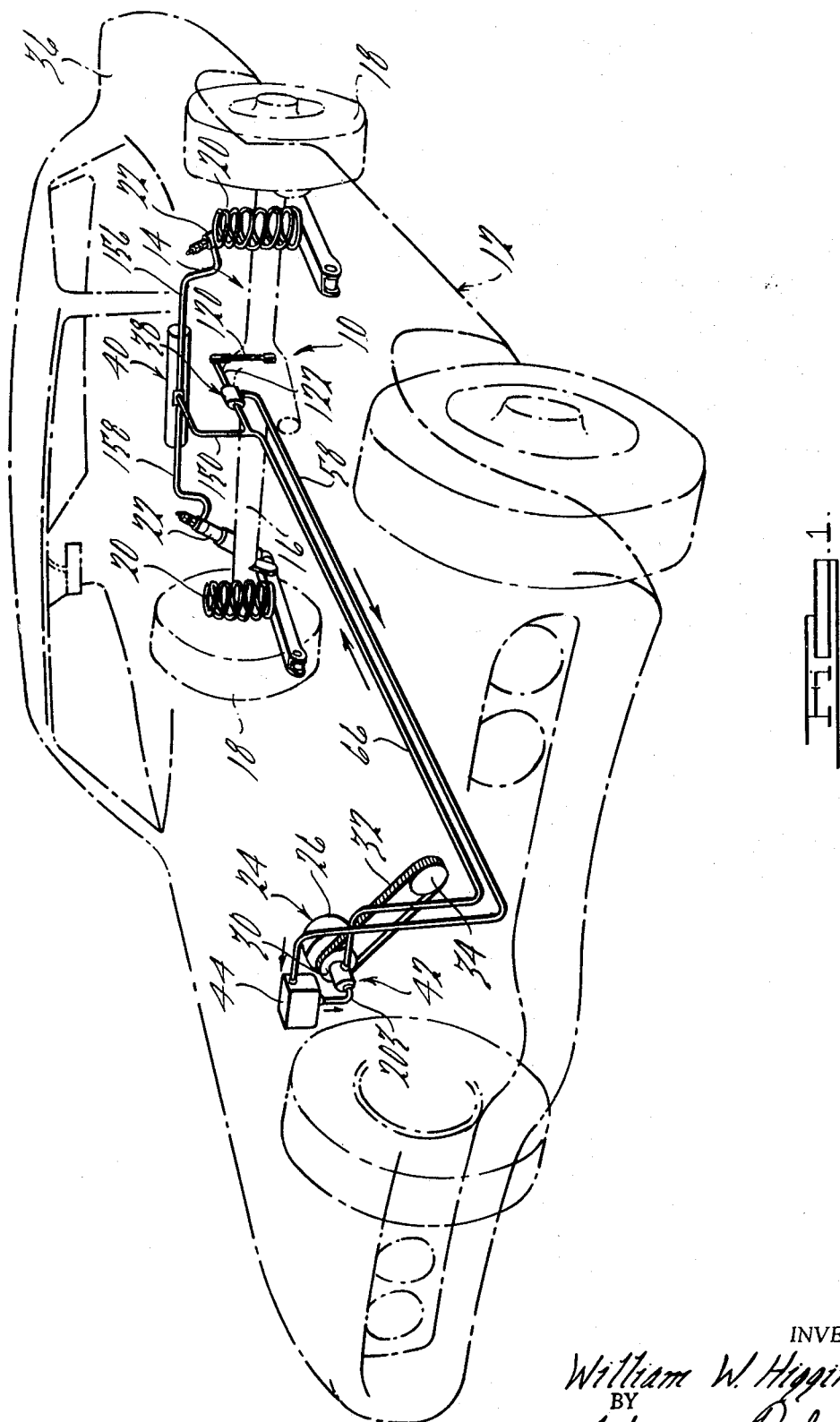
INVENTOR.
William W. Higginbotham
BY
Harness, Dickey & Pierce
ATTORNEYS

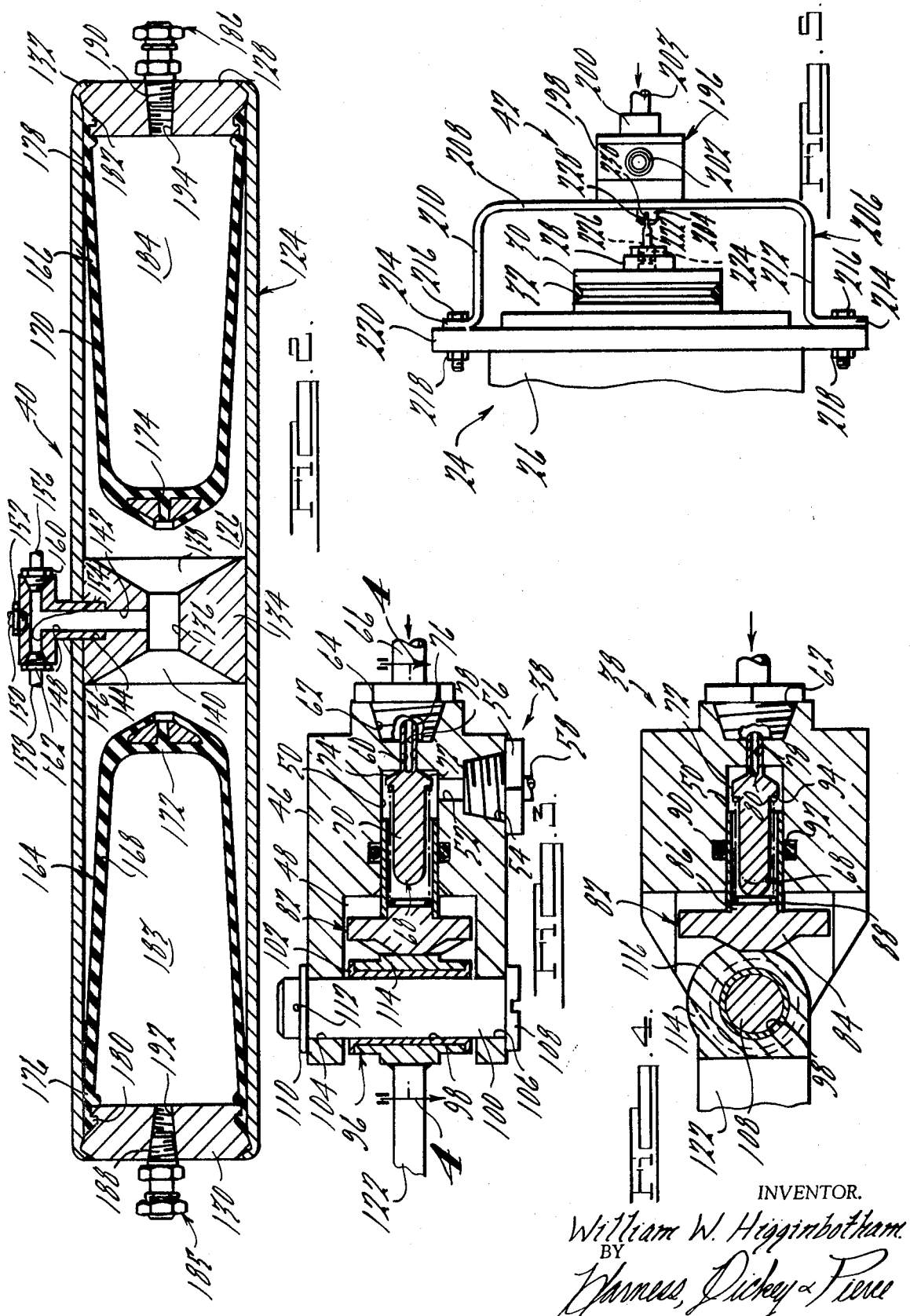

VEHICLE LEVELING SYSTEM

BACKGROUND OF THE INVENTION

During the last several years, the need for greater load-carrying capacity in automotive vehicles has continuously increased. This need has resulted from various factors such as increased vehicle dimensions, larger engines, and the more frequent use of automobiles for pulling trailers and the like and for carrying as many as six passengers along with heavy loads such as baggage, merchandise and sporting equipment. These uses have substantially increased the loads imposed upon the vehicle suspension systems at the rear end of the vehicles, causing a serious reduction in the clearance between the rear axles of the vehicles and the frame or body portions thereof. This, of course, has resulted in frequent bottoming or engagement of these portions of the vehicles when the vehicles are driven over bumpy roads and the like, thus eliminating to a large extent the effectiveness of the vehicle suspension systems. In addition, when the vehicle rear ends are heavily loaded, the front ends of the vehicles are disposed considerably above the rear portions thereof, thereby causing the vehicle's headlight beams to be directed upwardly and also serious impairment of rearward vision. Also, when the rear ends of vehicles are disposed below the front ends thereof, the vehicles lose a certain amount of stability required for high-speed turns made on modern turnpikes, expressways, toll roads and the like.

The seriousness of these problems has heretofore been recognized in the automobile industry, as evidenced by the development of a large variety of auxiliary suspension units which frequently take the form of coil springs, flat leaf springs, air cylinders and the like; however, it has been found that when such auxiliary suspension components have been incorporated in existing vehicle suspension systems, the performance and more particularly the balance of such systems is frequently adversely affected. In addition, many of such previously known auxiliary units have been difficult to install; have required the use of special fittings, complex brackets and the like; and have not been universally applicable to various designs and makes of vehicles. Also, in many instances such auxiliary units have materially affected the attitude of the vehicles when they are unloaded, i.e., they frequently raise the rear ends of the vehicles relative to the axles thereof, thus adversely affecting the appearance of the vehicles and the overall ride characteristics thereof when the vehicles are substantially unloaded or only lightly loaded.

SUMMARY OF THE INVENTION

This invention relates generally to a new and improved vehicle leveling system adapted to automatically maintain the body portion of a vehicle in a substantially level attitude regardless of the degree of loading imposed thereon. More particularly, the present invention relates to a vehicle leveling system of the above character adapted to pump a preselected quantity of an actuating fluid to and from an associated leveling mechanism, such as the vehicle's shock absorbers or the like, in accordance with preselected changes in the attitude of the spring-supported body portion of the vehicle with respect to the unsprung supported axle portion thereof.

It is accordingly a primary object of the present invention to provide a new and improved vehicle leveling system adapted to overcome the heretofore encountered loading problems associated with automotive vehicles.

It is another object of the present invention to provide a new and improved vehicle leveling system of the above character which is adapted to utilize as a source of motive power for the actuating fluid pump, the generator, alternator or similar device on the vehicle employed as a source of electrical energy.

It is still another object of the present invention to provide a new and improved leveling system of the above character which is entirely automatic in operation and which is adapted to be used on virtually all types of automotive vehicles, thereby providing for universality of installation.

It is still another object of the present invention to provide a new and improved leveling system for the above character that is extremely stable in operation and which will not be prematurely energized when the vehicle is braking, accelerating or traversing a road irregularities or the like.

It is a further object of the present invention to provide a new and improved leveling system of the above character which is durable in operation and may be easily installed on a vehicle.

It is still a further object of the present invention to provide a new and improved leveling system of the above character that is of a relatively simple design, consists of readily available component parts and is therefore economical to commercially manufacture.

It is a further object of the present invention to provide a new and improved leveling system of the above character which utilizes a novel control or leveling valve which functions to restrict the flow of actuating fluid between a source thereof and the associated vehicle leveling devices and thereby cause an increase in the fluid pressure to the leveling devices to effect selective actuation thereof.

It is another object of the present invention to provide a new and improved fluid accumulator for use in the leveling system of the present invention.

Other objects, features and advantages of the present invention will become apparent from the following detailed description taken in conjunction with the accompanying drawings.

BRIEF DESCRIPTION OF THE DRAWINGS

FIG. 1 is a schematic representation of the vehicle leveling system of the present invention as shown in operative association with a typical automotive vehicle;

FIG. 2 is a longitudinal cross-sectional view of the fluid accumulator incorporated in the vehicle leveling system of the present invention;

FIG. 3 is a transverse cross-sectional view of the leveling valve incorporated in the vehicle leveling system of the present invention;

FIG. 4 is a longitudinal cross-sectional view taken substantially along the line 4—4 of FIG. 3, and FIG. 5 is an enlarged fragmentary side elevational view of the fluid pump and associated actuating means incorporated in the vehicle leveling system of the present invention.

DETAILED DESCRIPTION OF A PREFERRED EMBODIMENT

Referring now in detail to the drawings, a vehicle leveling system 10, in accordance with an exemplary embodiment of the present invention, is shown in operative association with a conventional automotive vehicle 12 having a rear suspension system 14 including a transversely extending rear axle assembly 16 adapted to operatively support the vehicle's rear wheels 18. The axle assembly 16 is operatively connected to the vehicle 12, at least in part, by means of a pair of helical coil springs or the like 20 and a pair of conventional hydraulically actuated elevating assemblies 22 which may be and preferably consist of a pair of hydraulically actuated shock absorbers or the like of any suitable type well known in the art. The automotive vehicle 12 is provided with an engine driven means of producing the electrical energy required by the vehicle, which means is illustrated herein in the form of a suitable generator or alternator, generally designated by the numeral 24, and hereinafter referred to as an alternator. The alternator 24 comprises a generally cylindrical-shaped housing 26 and is provided with a rotatable drive shaft 28 which carries a suitable drive pulley or the like 30. The pulley 30 is operatively connected via a suitable drive belt or the like 32 with a cooperable engine driven pulley 34 which is rotatable, for example, in response to rotation of the engine crankshaft or the like as is well known in the art.

Generally speaking, the leveling system 10 of the present invention comprises three separate but cooperative assemblies which function to supply hydraulic actuating fluid from a suitable source thereof to the leveling devices or shock absorbers 22 to effect raising or lowering of the vehicle chassis or body 36 with respect to the axle assembly 16 in response to various load conditions imposed upon the vehicle 12, whereby the vehicle body or chassis 36 will be maintained in a substantially level attitude regardless of the degree of the loading thereof. Briefly, the aforesaid assemblies, which are hereinafter described in detail, comprise a leveling valve assembly 38 which functions to sense changes in attitude between the axle assembly 16 and the chassis 36, a fluid accumulator assembly 40 which functions to selectively communicate hydraulic actuating fluid to the leveling devices 22, and a fluid pumping assembly 42 which is operable in response to operation of the alternator 24 to continuously circulate hydraulic actuating fluid between a suitable fluid reservoir or container thereof 44 and the accumulator assembly 40.

Referring now in detail to the construction of the leveling valve assembly 38, as best seen in FIGS. 3 and 4, the assembly 38 comprises an external housing or enclosure 46 which is formed with a pair of coaxially arranged bore sections 48 and 50, the former of which section 48 is approximately twice as large in diameter as the section 50. The bore section 50 is communicable by a suitable transversely extending fluid passage 52 and counterbore 54 with a suitable fluid fitting 56 and fluid conduit 58 which connects the assembly 38 with the fluid reservoir 44. Similarly, the bore section 50 is communicable via a suitable longitudinally extending bore 60 and counterbore 62 with a fluid fitting 64 and conduit 66 which operatively connects the valve assembly 38 with the pump assembly 42.

Disposed within the bore section 50 is a valve member, generally designated 68 which comprises an elongated cylindrical body section 70 that terminates at the right end thereof (see FIG. 3) in a radially outwardly extending shoulder portion 72 that defines an outwardly directed tapered surface 74 which is adapted to cooperate with the adjacent end of the bore section 50 to selectively control the flow of fluid between the bore 60 and fluid passage 52. The end of the valve member 68 upon which the shoulder 72 is formed is provided with an elongated cylindrical reduced diameter guide portion 76 which extends through the bore 60 and is formed with a longitudinally extending bore or passage 78 which is adapted to be communicable with the interior of the bore section 50 through a suitable radially extending passage 80, as seen in FIG. 4. It will be appreciated, of course, that the passages 78, 80 are not communicable with the interior of the bore section 50 until the valve member 68 is translated from the position shown in FIG. 3 to the position shown in FIG. 4.

Disposed within the enlarged diameter bore section 48 is a generally disc-shaped plunger member 82 which comprises a main enlarged diameter body section 84 and a reduced diameter, longitudinally extending embossed portion 86 which is coaxially aligned with the bore section 50 and is adapted to operatively support one end of a sealing collar member 88 that extends longitudinally within the section 50 between the inner periphery hereof and the outer periphery of the body section 70 of the valve member 68. The outer periphery of the collar member 88 is adapted to cooperate with a suitable O-ring sealing member or the like 90 disposed within an annular recess or groove 92 formed around the periphery of the bore section 50, whereby to provide a fluidtight seal between the interior of the bore section 50 and the bore section 48. The collar member 88 is spaced radially outwardly from the outer periphery of the valve member 68 so as to provide room for a longitudinally extending helical valve spring 94, one end of which abuts against the embossed portion 86 and the opposite end of which abuts against the shoulder 72. As will be apparent, the valve spring 94 functions to resiliently urge the valve member 68 toward the right in FIGS. 3 and 4, whereby said member 68 is biased toward a position closing a flow path between the bore 78 and the interior of the bore section 50, and hence the valve spring 94 functions to resist fluid flow from the conduit 66 through the bore 60, bore section 50 and bore 52 to the conduit 58.

Mounted within the bore section 50 is an annular actuating sleeve member 96 which is arranged at generally right angles with the valve member 68 and defines a generally cylindrically shaped bore 98 through which a transversely extending support shaft, generally designated 100, extends. An antifriction bushing or bearing member 102 is interposed between the outer periphery of the shaft 100 and the inner periphery of the bore 98, whereby to support the sleeve member 96 for relative rotational movement with respect to the shaft 100. The opposite ends of the shaft 100 are received within a pair of aligned bores 104 and 106 formed in the opposite sides of the housing 46, with the shaft 100 being mounted against any relative axial movement thereof with respect to the housing 46 by means of an enlarged head section 108 located at one end of the shaft 100 and a suitable retaining ring or the like 110 disposed at the opposite end of the shaft 100 and held in place by a suitable cotter key or the like, representatively designated by the numeral 112.

As best seen in FIG. 4, the outer periphery of the sleeve member 96 is formed with a radially outwardly extending cam section 114 which defines an annular camming surface 116 that is eccentrically oriented with respect to the axis of the shaft 100. The surface 116 is adapted to abuttingly engage the extreme left end of the plunger member 82, as illustrated in FIGS. 3 and 4, and the cam section 114 is designed such that upon preselected rotational movement of the sleeve member 96, the camming surface 116 will bias the plunger member 82 toward and away from the section 50. It will be appreciated, of course, that at such time as the plunger member 82 moves toward the bore section 50, i.e., toward the right in FIGS. 3 and 4, the resilient force of the valve spring 94 urging the valve member 68 toward sealing engagement with the right end of the bore section 50 will be increased. Similarly, movement of the plunger member 82 away from the bore section 50 will relieve or reduce the resilient force which the valve spring 94 exerts against the valve member 68 so as to permit the valve member 68 to be more easily biased out of sealing engagement with the right end of the bore section 50. Thus, it will be seen that rotation of the sleeve member 96 and hence the cam section 114 thereon will control the amount of restriction of fluid flowing from the conduit 66 via the bore section 50 to the conduit 58.

The housing 46 is adapted to be secured by any suitable means to the sprung portion or chassis 36 of the vehicle 12, and the sleeve member 96 is adapted to be connected to the axle assembly 16 in a manner such that relative movement of the assembly 16 with respect to the chassis 36 will effect rotation of the sleeve member 96. Such means for operatively connecting the sleeve member 96 to the axle assembly 16 is preferably provided by a pair of connecting link members or arms 120 and 122. In particular, one end of the arm 120 is adapted to be attached by any suitable means to the axle assembly 16, while the opposite (upper) end of the arm 120 is adapted to be pivotably or otherwise secured to one end of the arm 122, with the opposite end of the arm 122 being connected, as by welding or the like, to the sleeve member 96, as best illustrated in FIGS. 3 and 4. It will thus be seen that upward and downward movement of the axle assembly 16 will cause the arm 122 to be pivoted in a corresponding manner, thereby causing rotation of the sleeve member 96 and selective movement of the valve member 68, as will hereinafter be described.

Referring now in detail to the construction of the fluid accumulator assembly 40, as best seen in FIG. 2, the assembly 40 comprises an elongated cylindrical housing 124 which defines an internal chamber 126. The longitudinally opposite ends of the housing 124 are adapted to be closed by means of a pair of end closure members 128 and 130 which have the longitudinal marginal ends of the housing 124 crimped or otherwise deformed inwardly, as seen at 132, whereby to fixedly secure the members 128, 130 to the housing 124. Disposed within the chamber 126 approximately midway between the end closure members 128, 130 is a manifold block member 134 which is formed with a longitudinally extending bore or passage 136 that terminates at the opposite ends thereof and a pair of tapered inlet or flow passages 138 and 140, with the passages 136, 138 and 140 functioning to communicate the portions of the chamber 126 on the opposite sides of the block 134.

The manifold block 134 is formed with a transversely or radially extending flow passage 142 which is communicable at its inner end with the passage 136 and is formed with a counterbore 144 at the outer end thereof. The counterbore 144 is adapted to nestingly receive a fluid fitting member 146 which is formed with a flow passage 148 communicable at the inner end thereof with the passage 142. The outer end of the passage 148 is adapted to be communicable with a fluid conduit 150 via a suitable fluid fitting 152, the conduit 150 being connected with the aforedescribed conduit 66, as illustrated in FIG. 1. The fluid fitting 146 is formed with a cross-bore or passage 154 which intersects the passage 148 and is communicable at the opposite ends thereof with a pair of fluid conduits 156 and 158 via suitable fluid fittings 160 and 162, respectively. The opposite ends of the conduits 156, 158 are adapted to be communicable with the elevating assemblies 22 in any conventional manner such that when actuating fluid is pumped to or from the assemblies 22 through the conduits 156, 158, the assemblies 22 will expand or contract to raise or lower the rear end of the vehicle chassis 36 with respect to the axle assembly 16, as will later be described.

Disposed within the interior of the chamber 126 between the opposite sides of the manifold block 134 and end members 128 and 130 is a pair of resilient deformable or compressible, generally dome-shaped diaphragm members 164 and 166. The members 164, 166 are preferably fabricated of a resilient fluid impervious material such as synthetic rubber or the like and comprise generally annular side wall portions 168 and 170, respectively, which extend longitudinally of the housing 124 and taper or converge a radially inwardly toward the center thereof. The innermost ends of the members 164, 166 are formed with reinforced domed-like end portions 172 and 174, while the opposite (outer) ends of the members 164, 166 define mounting or securing end portions 176 and 178, respectively, defining securing lips or shoulders 180 and 182, respectively, that are adapted to be clampingly received between the end members 128 and 130 and the adjacent ends of the housing 124. The end portions 176, 178 are thereby adapted to provide a fluidtight seal with the end members 128 and 130, whereby the end members 128, 130 and diaphragm members 164, 166 define a pair of gastight compressible chambers 183 and 184 which are adapted to be charged with a gaseous material, such as nitrogen or some other suitable inert gas. Means for charging the chambers 183, 184 is preferably provided by a pair of gas valve assemblies 185 and 186, respectively, which may be of any suitable construction and have suitable fitting means 188, 190 received within suitable bores or passages 192 and 194 formed in the end members 130 and 128, respectively, and communicable with the interior of the chambers 183 and 184. Preparatory to operation of the leveling system 10 of the present invention, the chambers 183, 184 are adapted to be charged with the aforementioned gas, with the chamber 183 preferably being charged with a gas at a pressure of between 100 and 150 p.s.i. and the chamber 184 being charged at a pressure of between 350 and 400 p.s.i. As will hereinafter be described, the differential pressure to which the chambers 183, 184 are charged serves to provide for an extremely low spring rate for the leveling system 10 and to minimize the amount of actuating fluid required to effect expansion or extension of the elevating assemblies 22 in order to achieve leveling of the vehicle 12 when it is heavily loaded.

Referring now in detail to the construction of the pump assembly 42, as best seen in FIG. 5, the assembly 42 comprises a hydraulic actuating pump, generally designated 196 which may be of any suitable construction and is provided with an external housing or enclosure 198 within which a pair of fluid fittings 200 and 202 are provided. The fitting 200 is adapted to connect a fluid conduit 203 with the pump 196, which conduit 203 is communicable at the opposite end thereof, with the fluid reservoir 44 as shown in FIG. 1. The fluid fitting 202, on the other hand, is adapted to be communicable with the aforedescribed conduit 66 which is connected at the end thereof opposite from the pump 196 with the leveling valve assembly 38.

The pump 196 comprises an input or drive shaft 204 which is adapted to rotate in a conventional manner to drive a fluid impeller (not shown) or similar device for pumping fluid from the reservoir 44 to the leveling valve assembly 38. As shown in FIG. 5, the pump 196 is adapted to be mounted by means of a suitable support bracket or the like, generally designated 206, at a position wherein the drive shaft 204 thereof is coaxially aligned with the drive shaft 28 of the alternator 24. The support bracket 206 comprises a generally flat, vertically extending forward portion 208 upon which the pump housing 198 is suitably secured, with the bracket portion 208 being formed with rearwardly extending portions 210 and 212 defining mounting flange portions 214 which are adapted to be secured by suitable screws, bolts or the like 216 and nuts 218 to an outwardly extending adapter plate member 220 that is secured to one end of the alternator housing 26, as illustrated. It will be appreciated, of course, that various alternative ways may be used for supporting the pump 196 in driving relation with respect to the alternator 24, and that the present invention is not intended to be limited to the specific construction illustrated and described herein.

In accordance with the present invention, the drive shaft 28 of the alternator 24 is adapted to be directly drivingly connected with the shaft 204 of the pump 196, whereby operation of the alternator 24 in response to energization of the vehicle engine will result in actuation of the pump 196. While any suitable means may be utilized for drivingly connecting the shafts 28 and 204, by way of example, a suitable drive coupling member or element 222 is illustrated herein and comprises a generally spherically shaped end portion 224 adapted to be received within a suitable recess 226 on the outer end of the shaft 28. The opposite or outer end of the element 222 is provided with a thin bladelike end portion 228 adapted to be received within a suitable complementary-shaped slot 230 in the end of the shaft 204, whereby to drivingly interconnect the element 222 of the shaft 204. The particular construction of the coupling or element 222 is intended to positively transmit rotary motive power from the alternator 24 to the pump 196, yet provide for any slight relative movement between the members 196 and 24 as might typically occur during operation of the associated vehicle engine.

In operation of the vehicle leveling system 10 of the present invention, assuming the initial condition that the vehicle engine is operating, resulting in operation of the alternator 24 and hence actuation of the pump 196 in response to rotation of the shaft 204, the pump assembly 42 will normally operate to continuously circulate actuating fluid from the reservoir 44 through the conduit 66 to the leveling valve assembly 38. The fluid thus circulated is at a substantially constant pressure and acts against the right end of the valve member 68 to bias the surface 74 out of engagement with the right end of the bore section 50, thereby permitting the fluid to flow through the passages 78 and 80 to the interior of the bore section 50 and thereafter through the passage 52 to the conduit 58 which returns the fluid to the reservoir 44. Thus, during such time as the vehicle 12 is in a substantially unloaded or lightly loaded condition, the pump assembly 42 will merely cause the actuating fluid to circulate between the reservoir 44 and leveling valve assembly 38.

At such time as the vehicle 12 becomes loaded to any appreciable degree, the rear end of the chassis 36 will be lowered with respect to the axle assembly 16. When this occurs, the sleeve member 96 will be rotated due to pivotal movement of the arms 120 and 122, resulting in the cam section 114 biasing the plunger member 82 toward the right in FIGS. 3 and 4. Such movement of the plunger member 82 will effect compression of the valve spring 94 which will in turn bias the valve member 68 toward the right end of the bore section 50, thereby restricting the flow of actuating fluid through the valve assembly 38. As the actuating fluid is thus restricted, the pressure thereof will increase and when the pressure of the actuating fluid reaches a predetermined pressure level, the elevating assemblies 22 will expand longitudinally, thereby biasing the rearward end of the chassis 36 upwardly to a configuration wherein the chassis 36 is in a relatively level attitude.

In operation of the system 10, the fluid accumulator assembly 40, and in particular, the compressible diaphragm members 164, 166 therein, will be compressed a predetermined amount at such time as the fluid pressure exceeds the pressure of the compressed gas therewithin, i.e., exceeds, for example, 100 p.s.i. for the diaphragm member 164 and exceeds, for example, 350 p.s.i. for the diaphragm member 166. With this arrangement, the quantity of actuating fluid required to effect expansion of the elevating assemblies 22 is minimized to the extreme, since the compressed nitrogen within the diaphragm members 164, 166 continuously urge the members 164, 166 toward their expanded configuration within the chamber 126. More importantly, however, this "double" diaphragm arrangement provides for an extremely low spring rate and hence reduces the frequency of oscillation of the vehicle chassis 36 as the vehicle traverses road bumps and the like.

At such time as the vehicle 12 is unloaded a predetermined amount, resulting in the rear end thereof being raised some predetermined amount, the sleeve member 96 will be rotated a predetermined amount due to action of the arms 120, 122, whereby the cam section 114 will be biased so as to permit the plunger member 82 to move toward the left in FIGS. 3 and 4. When this occurs, the force of the valve spring 94 on the valve member 68 will be relieved, so as to provide for a greater flow of actuating fluid through the valve assembly 38. This, of course, reduces the pressure of the fluid circulating in the system and permits the elevating assemblies 22 to contract some predetermined amount so that the vehicle will be properly leveled in its unloaded condition.

A particular feature of the present invention resides in the fact that the valve member 68 functions to restrict the flow of fluid through the valve assembly 38 in both directions. Accordingly, no damping is required of either the arms 120, 122 or of the valve member 68 in order to prevent inadvertent actuation of the valve assembly 38 when the vehicle traverses road bumps or similar surface irregularities which cause momentary changes in attitude of the vehicle chassis 36 with respect to the axle assembly 16.

Although particular reference has been made herein to the leveling system 10 of the present invention being operatively associated with the alternator 24 and shock absorbers or similar devices 22, it will be noted that the present invention is not necessarily limited to such a combination, since the leveling system 10 may operate effectively with various other sources of motive power for the pump 196, such as the vehicle water pump, cooling fan or the like. Furthermore, it will be noted that the raising and lowering of the vehicle body with respect to the axle assembly thereof may be accomplished by any one of a number of well known fluid pressure expandable devices other than hydraulic shock absorbers, for example, conventional hydraulically actuated piston and cylinder assemblies or the like. In addition, it will be appreciated that the leveling system 10 of the present invention may be provided with manually actuable switch means adapted to be located on the dashboard or instrument panel of the vehicle and function to either supplement or replace the controlling function of the valve assembly 38.

While it will be apparent that the preferred embodiment illustrated herein is well calculated to fulfill the objects above stated, it will be appreciated that the present invention is susceptible to modification, variation and change without departing from the scope of the invention.

I claim:

1. In combination with an automotive vehicle having sprung and unsprung portions and comprising an engine driven electrical energy producing mechanism,
   a leveling system comprising at least one fluid actuatable leveling device for controlling the relative attitude between the vehicle portions,
   a source of actuating fluid for said leveling device and fluid passage defining means for communicating fluid between said source and said device,
   pump means for pumping fluid through said passage defining means and being drivingly connected to said electrical energy producing mechanism, whereby
   operation of said mechanism during energization of the vehicle engine will result in actuation of said pump means so that said pump means will maintain said actuating fluid at a preselected relatively constant pressure, and
   means responsive to preselected relative attitude changes of said vehicle portions for changing said fluid pressure and thereby effecting actuation of said leveling device.

2. The combination as set forth in claim 1 which includes an engine driven alternator having a rotatable drive shaft, a fluid pump including a rotatable drive shaft for pumping fluid through said passage defining means, and means including a coupling means drivingly connecting said drive of said alternator with said drive shaft of said pump.

3. The combination as set forth in claim 2 which includes support means fixedly secured to said alternator and adapted to support said pump adjacent thereto and in a position wherein said drive shaft of said pump is substantially coaxially aligned with said drive shaft of said alternator.

4. The combination as set forth in claim 1 which includes a valve actuatable in response to relative changes in attitude of said vehicle portions for changing the pressure of said fluid.

5. The combination as set forth in claim 1 which includes a pair of leveling devices each having one end thereof connected to the sprung portion of the vehicle and the opposite end thereof connected to the unsprung portion of the vehicle, and which further includes fluid accumulator means for receiving fluid from said source thereof and communicating the same to each of said leveling devices.

6. The combination as set forth in claim 1 which includes an engine driven alternator having a rotatable drive shaft, a fluid pump including a rotatable drive shaft for pumping fluid through said passage defining means , coupling means drivingly connecting said drive of said alternator with said drive shaft of said pump, which includes a position responsive fluid control means for controlling the flow of fluid between said source thereof and said leveling device in response to changes in attitude between the portions of the vehicle, a pair of leveling devices each having one end thereof connected to one portion of the vehicle and the opposite end thereof connected to the other portion of the vehicle, and fluid accumulator means for receiving fluid from said source thereof and communicating the same to each of said leveling devices, said fluid accumulator means including first and second deformable means adapted to move in response to preselected fluid pressure within said accumulator means.

7. In combination in a vehicle having a sprung portion and an unsprung portion and at least one fluid pressure responsive elevating means for controlling the relative attitude therebetween,
   a source of actuating fluid for the elevating means and fluid passage defining means for communicating fluid between said source and said elevating means,
   pumping means for pumping fluid through said passage defining means at a preselected relatively constant fluid pressure level, and
   means responsive to relative attitude changes of said vehicle portions for changing said fluid pressure from said relatively constant level and thereby actuating said elevating means.

8. The combination as set forth in claim 7 wherein said last mentioned means comprises position responsive means actuatable in response to changes in the relative attitude between the sprung and unsprung portions of the vehicle.

9. The combination as set forth in claim 8 wherein said position responsive means in adapted to restrict the flow of actuating fluid between said source thereof and said elevating means.

10. The combination as set forth in claim 9 wherein said position responsive means includes valve means movable between positions opening and closing a flow passage between said fluid source and said elevating means.

11. The combination as set forth in claim 7 wherein said pumping means normally provides a relatively constant fluid pressure to said leveling means, and wherein said last mentioned means is operable to change said fluid pressure in response to preselected changes in attitude between the sprung and unsprung portions of the vehicle.

12. The combination as set forth in claim 7 which includes an engine driven electrical energy producing means, and means drivingly connecting said electrical energy producing means with said pumping means.

13. The combination as set forth in claim 12 wherein said electrical energy producing means comprises an alternator.

14. The combination as set forth in claim 7 which includes fluid accumulator means adapted to receive fluid from said source thereof and communicate the same to said leveling device, said fluid accumulator means comprises an exterior housing and means defining first and second pressure chambers within said housing.

15. The combination as set forth in claim 7 which includes a pair of leveling devices each having one end thereof connected to the sprung portion of the vehicle and the opposite end thereof connected to the unsprung portion of the vehicle, and which further includes fluid accumulator means for receiving fluid from said source thereof and communicating the same to each of said leveling devices.

16. The combination as set forth in claim 7 wherein said last mentioned means comprises position responsive means actuatable in response to changes in the relative attitude between the sprung and unsprung portions of the vehicle, wherein said pumping means normally provides a relatively constant fluid pressure to said leveling means, and wherein said last mentioned means is operable to change said fluid pressure in response to preselected changes in attitude between the sprung and unsprung portions of the vehicle, and engine driven electrical energy producing means, means drivingly connecting said electrical energy producing means with said pumping means, a pair of leveling devices each having one end thereof connected to the sprung portion of the vehicle and the opposite end thereof connected to the unsprung portion of the vehicle, and fluid accumulator means for receiving fluid from said source thereof and communicating the same to each of said leveling devices.

17. The combination as set forth in claim 7 which includes a valve member for selectively controlling the flow of fluid between said source thereof and said elevating means, said valve member including a valve housing, a valve member cooperable with said housing to define a flow passage, and means for moving said valve member toward positions opening and closing said flow passage in response to relative movement between the sprung and unsprung portions of the vehicle.

18. The combination as set forth in claim 17 which includes cam means for selectively moving said valve member from within said housing.

19. The combination as set forth in claim 17 which includes spring means resiliently urging said valve member toward a position closing said flow passage.

20. The combination as set forth in claim 18 which includes a sleeve member disposed within said housing, means supporting said sleeve member for relative rotational movement, which includes an eccentric cam member in said housing movable toward and away from said valve member in response to relative rotation of said sleeve member.

21. The combination as set forth in claim 20 which includes linkage means operatively connecting said sleeve member to said vehicle and adapted to move said cam member toward and away from said valve member in response to relative movement between the sprung and unsprung portions of the vehicle.

22. The combination as set forth in claim 20 which includes shaft means for rotatably supporting said sleeve member, wherein said sleeve member has said cam member formed integrally thereof and projecting outwardly therefrom, and which includes a plunger element interposed between said cam member and said valve member.

23. The combination as set forth in claim 22 which includes means defining first and second pressure chambers comprising a pair of resilient compressible domed-shaped diaphragm members having elongated side wall sections extending longitudinally within said housing and defining said chambers with the opposite ends thereof.

24. The combination as set forth in claim 23 wherein said first and second pressure chambers defined by said diaphragm members are pressurized at different pressures.

25. The combination as set forth in claim 24 which includes a pair of longitudinally spaced end members closing the opposite ends of the said housing, said end members cooperating with said side wall sections of said diaphragm members to define said pressure chambers.

26. The combination as set forth in claim 25 which includes fluid passage means between the interior of said housing and said elevating means.

27. The combination as set forth in claim 26 which includes a pair of pressure responsive elevating means, which includes fluid passage means defining a fluid path from said source to the interior of said accumulator housing and between said accumulator housing and each of said elevating means.

28. The combination as set forth in claim 17 wherein said valve member is movable between first and second positions and is operable to restrict the flow of fluid through said valve house when moved toward either of said positions.

29. In combination in a vehicle having a sprung portion and an unsprung portion and at least one fluid pressure responsive elevating means for controlling the relative attitude therebetween, a source of actuating fluid for the elevating means and fluid passage defining means for communicating fluid between said source and said elevating means, pumping means for pumping fluid through said passage defining means, and a valve assembly for selectively controlling the flow of fluid between said source thereof and said elevating means, said valve assembly including a valve housing, a valve member cooperable with said housing to define a flow passage, spring means resiliently urging said valve member toward a position closing said flow passage, a sleeve member disposed within said housing, means supporting said sleeve member for relative rotational movement, and an eccentric cam member in said housing movable toward and away from said valve member in response to relative rotation of said sleeve member, and thereby moving said valve member toward positions opening and closing said flow passage in response to relative movement between the sprung and unsprung portions of the vehicle.

30. The combination as set forth in claim 29 which includes linkage means operatively connecting said sleeve member to said vehicle and adapted to move said cam member toward and away from said valve member in response to relative movement between the sprung and unsprung portions of the vehicle.

31. The combination as set forth in claim 29 which includes shaft means for rotatably supporting said sleeve member, wherein said sleeve member has said cam member formed integrally thereof and projecting outwardly therefrom, and which includes a plunger element interposed between said cam member and said valve member.

32. In combination in a vehicle having a sprung portion and an unsprung portion and at least one fluid pressure responsive elevating means for controlling the relative attitude therebetween.
- a source of actuating fluid for the elevating means and fluid passage defining means for communicating fluid between said source and said elevating means,
- pumping means for pumping fluid through said passage defining means,
- means for selectively controlling the actuation of said elevating means by controlling the pressure of the fluid communicated to said elevating means,
- a fluid accumulator adapted to receive fluid from said source thereof and communicate the same to said leveling device,
- said fluid accumulator comprises an exterior housing and a pair of resilient compressible elements extending longitudinally within said housing and defining said chambers with the opposite ends thereof, said elements comprising generally domed-shaped diaphragm members having elongated side wall sections pressurized at different pressures and extending longitudinally within said housing.

33. The combination as set forth in claim 32 which includes a pair of longitudinally spaced end members closing the opposite ends of said housing, said end members cooperating with said side wall sections of said diaphragm members to define said pressure chambers.

34. The combination as set forth in claim 33 which includes fluid passage means between the interior of said housing and said elevating means.

35. The combination as set forth in claim 33 which includes a pair of pressure responsive elevating means, which includes fluid passage means defining a fluid path from said source to the interior of said accumulator housing and between said accumulator housing and each of said elevating means.

* * * * *